United States Patent [19]

Nelson

[11] 4,116,210
[45] Sep. 26, 1978

[54] DIVERTER SPOUT ASSEMBLY

[75] Inventor: Merritt J. Nelson, Sparta, Mich.

[73] Assignee: Zin-Plas Corporation, Comstock Park, Mich.

[21] Appl. No.: 722,145

[22] Filed: Sep. 10, 1976

[51] Int. Cl.² ............................................. F16K 1/00
[52] U.S. Cl. .................................. 137/119; 137/467; 239/443
[58] Field of Search ............... 239/25, 310, 443, 312; 137/467, 119, 359

[56] References Cited

U.S. PATENT DOCUMENTS

| 3,207,445 | 9/1965 | Court et al. | 239/310 X |
| 3,341,132 | 9/1967 | Parkison | 239/443 |
| 3,473,558 | 10/1969 | Mongerson | 137/467 |
| 3,906,990 | 9/1975 | Nelson | 137/467 X |
| 3,913,605 | 10/1975 | Ward | 137/467 X |
| 3,939,865 | 2/1976 | Nelson | 137/467 |

Primary Examiner—Joseph F. Peters, Jr.
Assistant Examiner—Norman L. Stack, Jr.
Attorney, Agent, or Firm—McGarry & Waters

[57] ABSTRACT

A diverter spout assembly includes a spout having a discharge opening, an inlet and a passageway therebetween. A valve mount is secured at a rear portion adjacent the inlet. The valve mount has a cavity therein which defines an inner chamber having a passage therethrough to the discharge opening. A diverter conduit is operably connected to the inner chamber. The diverter conduit is substantially transverse to the passage through the inner chamber. A jet nozzle is mounted within the inner chamber substantially aligned with the passage. The jet nozzle has a front open end aligned over the front surface of the diverter outlet to minimize water leakage and siphon effects through the diverter outlet when water passes through the discharge opening. A valve is operably mounted on the valve mount to close the inner chamber from the discharge opening so that water supplied from the inlet opening is diverted to the diverter conduit.

12 Claims, 6 Drawing Figures

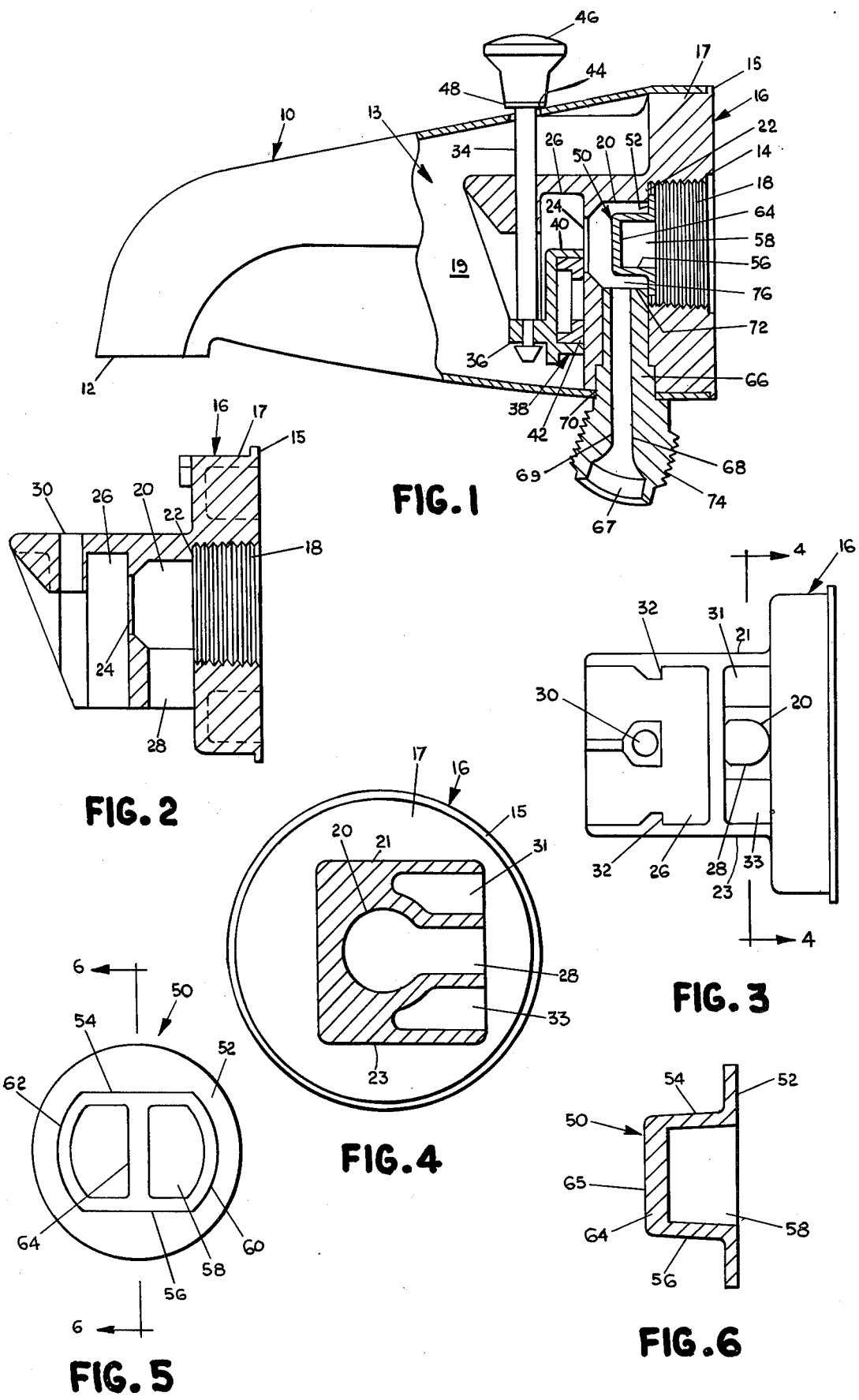

DIVERTER SPOUT ASSEMBLY

BACKGROUND OF THE INVENTION

1. Field of the Invention

This invention relates to diverter spout assemblies and more particularly to diverter spout assembies having a diverter conduit and a diverter valve to selectively divert water through the diverter conduit.

2. Description of the Prior Art

Certain diverter spouts are used in connection with hand held shower units. One such diverter spout is disclosed in the U.S. Pat. No. 3,906,990 issued to the applicant Nelson on Sept. 23, 1975. The Nelson patent discloses a tub spout assembly wherein a plastic valve assembly is mounted at a rear portion of the tub spout. The water supply pipe is operably connected to a tapered section which is operably connected to a water chamber. A valve is slideably mounted within the water chamber and can close the tapered portion off from the water chamber and discharge outlet.

In tub enclosures which do not have built in showers, a diverter conduit is provided in the tub spout. A diverter valve in the spout can operably direct water through the diverter conduit. The diverter conduit is usually operably connected to a flexible hose leading to a showerhead.

One such tub spout assembly is disclosed in the U.S. Pat. No. 3,913,605 issued to Ward on Oct. 21, 1975. The Ward patent discloses a tub spout assembly wherein the diverter conduit is provided by a tube projecting into the bore of the spout housing. The tube is transverse to the direction of the flow within the spout housing. The tube has an inlet end which is sloped in the direction of the water flow to deflect the water when the diverter valve is positioned for outflow through the discharge opening. The valve is mounted on a front portion of the spout housing to close the conduit passage to the discharge opening.

The problem encountered in diverter spout assemblies is that water may flow into the diverter conduit when water is normally flowing through the spout. This leakage is undesirable. On the other hand, in some assemblies, the diverter conduit is often placed within a reduced area of the spout wherein the water creates a siphoning effect drawing in unwanted air through the discharge opening from the diverter conduit when the water is flowing through the spout. A diverter spout assembly must be assembled so that the water leakage and siphoning effects are both minimized.

SUMMARY OF THE INVENTION

According to the invention, a diverter spout assembly with a discharge opening and a diverter conduit has means for minimizing water leakage and siphoning effects through the diverter conduit while water is passing through the discharge opening. The diverter spout is mounted on a water supply pipe and a passageway extends through the spout from the water supply pipe to the discharge opening. The diverter conduit is operably connected to the passageway at a substantially transverse angle.

Preferably, the diverter conduit has its inlet end flush with a side surface of the passageway and its outlet and protruding from the side of the spout. Preferably, the diverter conduit is a passage within a tubular insert extending through a side aperture in the spout. The outlet end of the tubular insert is externally threaded.

A channel having open ends is mounted within the passageway. The channel means has at least one side surface substantially aligned with the flow of water from the supply pipe and circumscribing the water flow. The side surfaces of the channel means are positioned over the diverter conduit and spaced from the inlet end so that an open passage is provided from the front open end of the channel to the inlet of the diverter conduit. Preferably, the side surface has its front edge aligned directly over the forward side of the diverter conduit. Preferably, the channel means includes a nozzle extending within the spout passageway mounted onto the water supply pipe so that the water from the water supply pipe passes through the nozzle into the passageway. Preferably, the end of the nozzle extends over the outlet conduit and is aligned with the front edge of the diverter conduit. The outer side surface of the jet nozzle is spaced away from the outlet conduit to provide a passage from the end of the nozzle to the inlet end of the diverter conduit.

In one embodiment, the jet nozzle has a constricted passageway smaller than the bore of the water supply pipe so as to create a water stream of greater water pressure therein than the water supply pipe.

A valve is operably mounted within the passageway to open and close the passageway to the discharge opening and alternatively divert water through either the discharge opening or the diverter conduit. Preferably, the passageway has an inner chamber wherein the jet nozzle and the tubular insert are mounted. The tubular insert is mounted at a substantially transverse angle to the jet nozzle. The inner chamber has an aperture parallel to and laterally aligned with the front open end of the jet nozzle. The valve operably closes or opens the inner chamber aperture to the rest of the passageway and alternatively diverts water to the discharge opening or diverter conduit. In one embodiment, the valve is operably mounted onto a valve mount which is in turn mounted to the interior of the diverter spout. The inner chamber is defined by a cavity within the valve mount insert. The tubular insert is mounted through a side aperture in the diverter spout and extends through the valve mount insert to a side surface of the inner chamber.

In one embodiment, the inner chamber has an outwardly extending shoulder. The jet nozzle has an outwardly extending flange at its rear portion thereof which abuts the shoulder and is secured thereto so the nozzle extends within the inner chamber. Preferably, a solvent weld ahderes the flange to the shoulder.

In this fashion, a diverter spout assembly has a diverter conduit and discharge opening and a single valve means wherein operation of the valve can divert water to either the discharge opening when in an open position or to the diverter conduit when in a closed position. A minimum amount of leakage and a minimum siphoning effect is achieved by the use of the jet nozzle extending over the diverter conduit and aligned to a front edge thereof.

BRIEF DESCRIPTION OF THE DRAWINGS

The invention will now be described with reference to the accompanying drawings in which:

FIG. 1 is a side elevational view partly in section of an embodiment of the invention.

FIG. 2 is a cross sectional view of the valve mount insert as illustrated in FIG. 1.

FIG. 3 is a bottom plan view of the valve mount insert as illustrated in FIG. 2.

FIG. 4 is a cross sectional view taken along the lines 4—4 in FIG. 3.

FIG. 5 is an enlarged front elevational view of the jet nozzle as illustrated in FIG. 1.

FIG. 6 is a cross sectional view along the lines 6—6 in FIG. 5.

DETAILED DESCRIPTION OF THE PREFERRED EMBODIMENT

Referring to FIG. 1, a spout 10 has a discharge opening 12 at a front end thereof and an inlet opening 14 at a rear section thereof. A passageway 13 therebetween has an inner chamber 20 and outer chamber 19. A valve mount insert 16 is secured to the interior of the diverter spout 10. The valve mount, as shown in FIG. 2, has a rear lip portion 15 and rear portion 17. A threaded inlet passage 18 extends through the lip portion 15 and rear portion 17. To the front of the inlet passage 14 is an inner chamber 20. A shoulder 22 extends outwardly from the rear of the inner chamber 20. The threads 18 of inlet passage 14 extend to the shoulder 22. To the front of the inner chamber 20 is an aperture 24 which leads to a slide channel 26. A bored hole 28 extends from a bottom side surface of the inner chamber 20 to the bottom of the valve mount insert 16.

As more clearly shown in FIG. 3, the inner chamber 20 is centrally located between the sides 21 and 23 of the valve mount insert 16. To the front of the inner chamber 20 and slide channel 26 is a stem aperture 30 extending through the top surface of the valve mount insert 16. To the sides of the stem aperture 30 are two ridges 32 which form the front edge of this slide channel 26.

As clearly shown in FIG. 4, the inner chamber 20 is cylindrical in shape. Indentations 31 and 33 are placed within the valve mount 16 to conserve on material. The material used to form the valve mount can be thermoplastic.

Referring again to FIG. 1, the valve mount lip 15 abuts the rear of the diverter spout 10. The rear portion 17 abuts the interior surface of the spout and is adhered thereto by an adhesive.

The valve stem 34 extends through stem aperture 30 and is secured to a tab 36 of a slide valve 38. The slide valve 38 has a retainer section 40 integrally formed to the tab 36. Within the retainer section 40 is a seal 42.

The stem 34 extends through stem aperture 30 and upper aperture 44 in the spout 10. This stem is capped with a knob 46. At the bottom edge of the knob 46 is a ring 48. The ring can be made from Neoprene or Buna-n.

Tube 66 fits within the bored hole 28 in the valve mount insert and aperture 70 in the diverter spout. The tube 66 has an inner end 72 which is flush with the side surface of the inner chamber 20. The tube 66 is mounted within the bored hole 28 so that a leak proof seal exists between the valve mount insert 16 and the tube 66. A diverter conduit 67 extends axially through the tube 66. The tube 66 has a threaded outer end 74. The axial outlet conduit 67 at the inner end 72 is perpendicular to the central axis of the inner chamber.

A jet nozzle 50 is placed within the inner chamber 20. As shown in FIGS. 5 and 6, the jet nozzle 50 has an aperture 58 therethrough and a flange 52 extending outwardly from a rear section of the nozzle 50. The jet nozzle 50 has straight surfaces 54 and 56 at opposite sides of the aperture 58. Connecting the two straight surfaces 54 and 56 are two curved surfaces 60 and 62. A connecting web 64 extends from the straight surface 54 to the straight surface 56 at the front end of the aperture 58. The aperture 58 has a smaller square area than the water supply pipe conduit (not shown).

As shown in FIG. 1, the flange 52 abuts shoulder 22 of the valve mount insert 16 and is secured thereto. The flange 52 can be secured by a solvent weld. For illustration, MEK is a suitable solvent weld. The surfaces 54, 56, 60, and 62 extend into the inner chamber 20 and over the diverter conduit. The front open end of the jet nozzle 50 is vertically aligned with the front edge of the outlet conduit 67.

A space 76 exists between the lower surface 56 of the jet nozzle 50 and the inner end 72 of the tube 66. The space 76 provides a passageway from the aperture 58 in the jet nozzle to the diverter conduit 67.

In operation, the slide valve 38 is operated by raising or lowering knob 46. When knob 46 is in a lower position, the slide valve 38 substantially opens aperture 24 to provide a passageway from inner chamber 20 through the slide channel 26 and out into the outer chamber 19 within the diverter spout 10. A water supply pipe (not shown) which is threaded into the inlet passage 14 supplies water through the jet nozzle 50. The jet nozzle 50 directs the water over the diverter conduit 67 and through the aperture 24 to the outer chamber 19 and finally out through the discharge opening 12. The placement of the front end 65 adjacent the front surface 69 of the outlet conduit 67 creates a balance between any siphoning effects through the diverter conduit 67 into the inner chamber 20 and any leaking effect of water from the inner chamber 20 down through the diverter conduit 67. By this structure, little or no leakage occurs through the diverter conduit 67 and little or no air will be siphoned through into the spout while the water is passing through the spout discharge opening 12.

Water may be diverted through the diverter conduit 67 by a lifting of the knob 46 to an upward position so that the slide valve 38 seals the aperture 24. The water in the supply pipe supplies water through the jet nozzle and into chamber 20. The water will then be diverted through the space 76 and through the diverter conduit 67.

It should be understood that the foregoing embodiment of the invention is merely illustrative of the invention and that various modifications and changes may be made to the invention without departing from the spirit and scope of the invention which is defined in the appended claims.

The embodiments of the invention in which an exclusive property or privilege is claimed are defined as follows:

1. In a diverter spout assembly having a spout with a discharge opening; a passageway within the spout for passing water from a water supply pipe to the discharge opening; a diverter conduit transversely connected to the passageway; a valve operably mounted within the passageway to alternatively open and close the passageway so as to alternatively direct water through the discharge opening or diverter conduit; the improvement comprising:

means within the passageway having open ends, a downstream end and upstream end, and channelling surfaces substantially aligned with the flow of water from the water supply pipe, circumscribing the water flow therethrough and positioned over the diverter conduit for channelling all the water over and past the diverter conduit, the downstream end of the channelling means so positioned to minimize water leakage and siphon effects through the diverter conduit;

means for mounting the channelling means within the passageway such that the channelling surface of the channelling means is substantially horizontal, vertically aligned over the diverter conduit, and spaced apart from the inlet end of the diverter conduit so as to form an open passage from the front open end of the channelling means to the inlet end of the diverter conduit; and the front edge of the channelling surface is directly aligned over the front edge of the diverter conduit.

2. In a diverter spout assembly having a spout with a discharge opening; a passageway within the spout for passing water from a water supply pipe to the discharge opening; a diverter conduit transversely connected to the passageway; a valve operably mounted within the passageway to alternatively open and close the passageway so as to alternatively direct water through the discharge opening or diverter conduit; the improvement comprising:

means within the passageway having open ends, a downstream end and upstream end, and channelling surfaces substantially aligned with the flow of water from the water supply pipe, circumscribing the water flow therethrough and positioned over the diverter conduit for channelling all the water over and past the diverter conduit, the downstream end of the channelling means so positioned to minimize water leakage and siphon effects through the diverter conduit;

means for mounting the channelling means within the passageway;

the channelling means comprising a nozzle mounted within the spout in the passageway so that water passes therethrough; and, the front open end of the nozzle being aligned with a side edge of the diverter conduit wherein the diverter conduit inlet end is aligned underneath the side of the nozzle and spaced apart from the side of the nozzle to provide a passage from the open end of the nozzle to the inlet end of the diverter conduit.

3. A diverter spout assembly as defined in claim 2 wherein the mounting means comprises an outwardly extending flange on the rear of the nozzle abutting and secured to a shoulder mounted within the spout.

4. A diverter spout assembly according to claim 2 wherein the diverter conduit has an inlet end flush with a side surface of the passageway.

5. A diverter spout assembly according to claim 2 wherein the nozzle has a constricted passage therethrough smaller than the bore of the water supplying pipe so that the nozzle has a greater water pressure therein than the water supply pipe.

6. A diverter spout assembly according to claim 5 wherein the passageway has an inner and outer chamber; the nozzle is positioned within the inner chamber; the diverter conduit is operably connected to the inner chamber; the valve is adapted to close the inner chamber off from the outer chamber and discharge opening so as to direct the water from the inner chamber to the diverter conduit and therethrough.

7. A diverter spout according to claim 6 wherein the diverter conduit has an inlet end flush with a side surface of the inner chamber.

8. A diverter spout according to claim 6 wherein the inner chamber has a passage aperture aligned with the central axis of the nozzle; and the passage aperture has a plane parallel to the end of the nozzle.

9. A diverter spout according to claim 8 wherein the valve is adapted to open and close the passage aperture of the inner chamber so as to alternatively direct water through the discharge opening or diverter conduit.

10. A diverter spout assembly according to claim 6 wherein a valve mount is positioned within the spout toward a rear portion thereof; the valve mount operably mounts the valve thereon; the inner chamber is substantially defined as a cavity within the valve mount so as to form the passageway from the inlet, through the inner and outer chambers and out to the discharge opening; the diverter conduit extends through the valve mount and is operably connected to the inner chamber.

11. A diverter spout assembly according to claim 10 wherein the nozzle has an outwardly extending flange positioned toward the rear thereof; the valve mount has a shoulder extending outwardly from the rear of the inner chamber; the front surface of the flange abuts the shoulder and is adhered thereon so the nozzle lies within the inner chamber.

12. A diverter spout assembly according to claim 10 wherein the valve mount has a bored aperture connected transversely to the inner chamber; a tube is mounted within the bored aperture with an inner end flush with the side surface of the inner chamber so as to form the diverter conduit therethrough.

* * * * *